United States Patent
Balzer et al.

(10) Patent No.: US 11,253,813 B2
(45) Date of Patent: Feb. 22, 2022

(54) METHOD FOR MANUFACTURING A DIAPHRAGM SUPPORT MEMBER, AND DIAPHRAGM SUPPORT MEMBER FOR THE SEPARATION OF HYDROGEN

(71) Applicant: GKN Sinter Metals Engineering GmbH, Radevormwald (DE)

(72) Inventors: Harald Balzer, Hagen (DE); Enrico Mählig, Cologne (DE); Nicola De Cristofaro, Remscheid (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 175 days.

(21) Appl. No.: 16/493,723

(22) PCT Filed: Mar. 7, 2018

(86) PCT No.: PCT/EP2018/055565
§ 371 (c)(1),
(2) Date: Sep. 12, 2019

(87) PCT Pub. No.: WO2018/166859
PCT Pub. Date: Sep. 20, 2018

(65) Prior Publication Data
US 2020/0023304 A1 Jan. 23, 2020

(30) Foreign Application Priority Data
Mar. 16, 2017 (DE) .................... 10 2017 105 607.6

(51) Int. Cl.
*B01D 53/22* (2006.01)
*B01D 71/02* (2006.01)
*C01B 3/50* (2006.01)

(52) U.S. Cl.
CPC ......... *B01D 53/228* (2013.01); *B01D 71/022* (2013.01); *C01B 3/501* (2013.01); *B01D 2256/16* (2013.01); *B01D 2313/04* (2013.01)

(58) Field of Classification Search
None
See application file for complete search history.

(56) References Cited

U.S. PATENT DOCUMENTS

| | | | |
|---|---|---|---|
| 2010/0028703 A1 | 2/2010 | Bredesen et al. | |
| 2012/0060692 A1* | 3/2012 | Haring ............... | C01B 3/505 96/10 |

(Continued)

FOREIGN PATENT DOCUMENTS

| | | |
|---|---|---|
| AT | 12132 U1 | 11/2011 |
| AT | 12607 U1 | 8/2012 |

(Continued)

OTHER PUBLICATIONS

English language machine translation for JP 2014-46229. Retrieved from translationportal.epo.org on Oct. 7, 2021. (Year: 2021).*

(Continued)

*Primary Examiner* — Jason M Greene
(74) *Attorney, Agent, or Firm* — Quarles & Brady LLP

(57) ABSTRACT

A method for manufacturing a diaphragm support member with a diaphragm support made of a sintered metal having a diaphragm layer, comprising at least the following steps: a. providing a laminar or tubular diaphragm support made of a porous sintered metal with a surface that is provided for the purpose of being coated with the diaphragm layer; b. providing a metallic connecting element for connecting the diaphragm support to a gas-carrying line; c. connecting the diaphragm support and connecting element with a weld seam to the diaphragm support member and forming a first connection zone between the weld seam and diaphragm support and a second connection zone between the weld (Continued)

seam and the connecting element; d. arranging a metal layer on the surface and the weld seam so that the metal layer covers at least the first connection zone; d. cohesively joining the metal layer at least with the surface and the weld seam; and e. coating at least portions of the surface and at least portions of the foil with the diaphragm layer. A diaphragm support member comprising at least one diaphragm support made of a porous sintered metal and a metallic connecting element for connecting the diaphragm support to a gas-carrying line is also provided.

19 Claims, 2 Drawing Sheets

(56) References Cited

U.S. PATENT DOCUMENTS

| | | | | |
|---|---|---|---|---|
| 2019/0001275 A1* | 1/2019 | Haydn | ............ | B01D 69/12 |
| 2019/0126206 A1* | 5/2019 | Haydn | ............ | B01D 71/022 |
| 2020/0016541 A1* | 1/2020 | Haydn | ............ | B01D 71/022 |

FOREIGN PATENT DOCUMENTS

| | | | | |
|---|---|---|---|---|
| DE | 10359813 A1 | | 7/2005 | |
| JP | 2012522639 A | | 9/2012 | |
| JP | 2014-46229 | * | 3/2014 | ............ B01D 69/04 |
| JP | 2014046229 A | | 3/2014 | |
| WO | 2010115562 A1 | | 10/2010 | |

OTHER PUBLICATIONS

Japan Patent Office, Notice of Reasons for Rejection, Application No. 2019-550831, dated Nov. 10, 2020, 11 pages.
PCT International Search Report, PCT/EP2018/055565, dated Jun. 11, 2018, 7 pages.
PCT International Preliminary Report on Patentability, PCT/EP2018/055565, dated Sep. 17, 2019, 8 pages.
German Patent Office, Office Action, Application No. 10 2017 105 607.6, dated Aug. 1, 2017, 4 pages.
Chinese Patent Office, First Office Action and Search Report, Application No. 201880018408.8, dated Jun. 11, 2021, 9 pages [No English Language Translation Available].

* cited by examiner

METHOD FOR MANUFACTURING A DIAPHRAGM SUPPORT MEMBER, AND DIAPHRAGM SUPPORT MEMBER FOR THE SEPARATION OF HYDROGEN

This application represents the U.S. national stage entry of International Application No. PCT/EP2018/055565 filed Mar. 7, 2018, which claims priority to German Patent Application No. 10 2017 105 607.6 filed Mar. 16, 2017, the disclosure of which is incorporated herein by reference in its entirety and for all purposes.

The present invention relates to a method for manufacturing a diaphragm support member and to a diaphragm support member for the permeative separation of hydrogen from hydrogen-containing gas mixtures. The diaphragm support member comprises a diaphragm support made of a porous sintered metal that can be connected to a reactor via a metallic connecting element.

WO 2010/115562 A1 discloses such a diaphragm support member, which is referred to in that document as a diaphragm pipe. The diaphragm pipe comprises a porous pipe made of a sintered metal with a palladium diaphragm containing or composed of palladium, the sintered metal pipe having at one end a fitting that is composed of a gas-tight material. The fitting is used for connecting to a reactor. Fitting and sintered metal pipe are connected to one another by sintering, brazing, or friction welding. This is intended to replace the joining of sintered metal pipe and reactor by welding (e.g., TIG welding), which is known to cause cracks after short operating times.

Proceeding from this background, it is the object of the present invention to resolve, at least in part, the problems described in connection with the prior art. In particular, a welded connection of a connecting element to a diaphragm support is to be proposed in which an impairment of the function of the diaphragm support as a result of potentially occurring cracks in the welded connection is to be prevented.

Contributing to this solution are a method for manufacturing a diaphragm support member according to the features of claim 1 and a diaphragm support member according to the features of claim 10. Advantageous developments are the subject of the dependent claims. The features listed individually in the claims can be combined in a technologically meaningful manner and supplemented by explanatory facts from the description and details of the figures, with additional design variants of the invention being indicated.

The invention relates to a method for manufacturing a diaphragm support member with a diaphragm support made of a sintered metal, the diaphragm support having a (gas-tight) diaphragm layer. The method comprises at least the following steps:
a. Providing a laminar or tubular diaphragm support made of a porous sintered metal with a surface that is provided for the purpose of being coated with the diaphragm layer;
b. providing a metallic connecting element for connecting the diaphragm support to a gas-carrying line;
c. connecting the diaphragm support and connecting element with a weld seam to the diaphragm support member and forming a first connection zone between the weld seam and diaphragm support and a second connection zone between the weld seam and the connecting element;
d. arranging a metal layer on the surface and the weld seam so that the metal layer covers at least the first connection zone;
e. cohesively joining the metal layer at least with the surface and the weld seam; and
f. coating at least portions of the surface and at least portions of the foil with the diaphragm layer.

The diaphragm support and thus in particular also the connecting element are preferably tubular, so that a gas mixture can be retained within the diaphragm support member and hydrogen can be discharged via the diaphragm support and the gas-tight diaphragm layer to an environment outside the diaphragm support member. In particular, the tubular diaphragm support is connected to the tubular connecting element by means of a peripheral weld.

The diaphragm layer consists particularly (exclusively) of palladium or of a palladium-containing alloy. Preferably, the diaphragm layer is deposited on the diaphragm support in a known manner by means of currentless metal deposition or sputtering techniques.

The working temperatures of the diaphragm support member and the diaphragm layer are particularly above 350 degrees Celsius, preferably above 400 degrees Celsius.

The joining of connecting element and diaphragm support by welding is usually performed before the diaphragm layer is applied to the diaphragm support. However, it has been observed in this joining operation that gaps can occur which make it difficult to coat this region with the diaphragm layer. Furthermore, especially when a diaphragm support made of sintered metal is used, the weld seam between the connecting element and the diaphragm support is often rough and partly porous or has cracks in the vicinity of the heat-affected zone of the weld seam. These circumstances also make it difficult to apply a diaphragm layer which is to carry out its assigned function of a gas-tight diaphragm layer.

Therefore, it is now proposed that a metal layer be arranged at least on the surface of the diaphragm support and on the weld, so that the metal layer covers at least the first connection zone.

In particular, the metal layer contains no more than 50% of the proportion of palladium that the diaphragm layer applied in step f. has.

In particular, the metal layer makes it possible to compensate for and/or cover unevenness or cracks in the first connection zone and/or the second connection zone and/or the weld. A completely gas-tight connection (even to hydrogen) can thus be achieved between connecting element and diaphragm support, enabling contamination of the hydrogen that is separated by means of the diaphragm support to be avoided.

In particular, before step d. but preferably after step c., the diaphragm support is at least partially coated with a diffusion barrier layer that forms the surface of the diaphragm support at least in part or completely. Preferably, at least the region of the surface that is provided for coating with the diaphragm layer in step f. is coated with the diffusion barrier layer.

In particular, the diffusion barrier layer is intended to prevent or at least limit degradation of the diaphragm layer as a result of diffusion interactions with the diaphragm support. This is a (ceramic) diffusion barrier layer consisting of partially yttrium-stabilized zirconium oxide or pure zirconium oxide or titanium oxide or aluminum oxide.

In particular, the diffusion barrier layer extends from the diaphragm support at least to the vicinity of the first connection zone.

The diffusion barrier layer is able to penetrate into pores or cracks in the vicinity of the weld seam and can thus have a locally increased thickness. Especially during the subsequent thermal loading of the diaphragm support member during operation or as part of a thermal treatment in the course of the manufacturing of the diaphragm support member, cracks may occur due to the different coefficients of thermal expansion of diffusion barrier layer and weld, which may affect the functionality of the diaphragm support member.

In particular, the metal layer is applied in such a way that, starting from the weld seam, it extends over the connection zone into the vicinity of the diaphragm support and at least partially covers the diffusion barrier layer.

The diffusion barrier layer is particularly also arranged between the metal layer and the diaphragm support, so that the metal layer rests against the surface of the diaphragm support having the diffusion barrier layer.

In particular, a metal layer comprising at least one of silver [Ag], copper [Cu], yttrium [Y], cerium [Ce], gold [Au], ruthenium [Ru], indium [In], and palladium [Pd] is applied in step d.

Preferably, the metal layer consists of at least 95% by mass of silver [Ag] or of copper [Cu].

In particular, a metal layer is deposited in step d. which has a thickness of no more than 50 μm [micrometers], preferably no more than 20 μm, especially preferably no more than 10 μm. The metal layer preferably has a thickness of at least 5 μm.

In particular, the metal layer is deposited on the surface and the weld seam in a known manner by means of currentless metal deposition or sputtering techniques.

In particular, the metal layer is a metallic foil that is arranged on the surface and the weld seam in step d. The metal layer thus preferably has a planar shape on the surface and the weld before being deposited, and it is particularly formed in a single piece.

In particular, a metallic foil in a soft-annealed state is deposited in step d.

The soft-annealed state allows for good deformability of the foil, so that it can be brought to rest over a maximally large area against the connecting element, the weld, and/or the surface of the diaphragm support.

According to an advantageous embodiment, the metallic foil is pressed in step d. by means of at least one elastically deformable roller against at least the weld and the surface (and possibly also against the connecting element).

It is also preferred that the metallic foil be cohesively joined at least with the surface (and possibly also with the weld and/or particularly to the connecting element) by means of seam welding.

According to another advantageous embodiment, the metal layer is cohesively joined at least with the surface and the weld (and possibly also with the connecting element) by means of sintering in step e.

All connections in which the connection partners are held together by atomic or molecular forces are referred to as cohesive connections. At the same time, they are non-detachable connections that can only be separated by destruction of the connecting means.

Also proposed is a diaphragm support member, particularly manufactured by the method described above. The diaphragm support member has at least one diaphragm support made of a porous sintered metal and a metallic connecting element for connecting the diaphragm support to a gas-carrying line. The diaphragm support and the connecting element are connected to one another by means of a weld seam, the diaphragm support having a surface that is coated with a diaphragm layer. A metal layer covers the weld seam (at least partially) and a region of the surface adjoining the weld seam, the diaphragm layer being arranged at least partially on the metal layer.

The metal layer is formed in a known manner particularly by the foil that is applied in the framework of the proposed method or by currentless metal deposition or sputtering techniques. The remarks regarding the method apply in like manner to the diaphragm support member.

In particular, the metal layer comprises at least one of the materials silver [Ag], copper [Cu], yttrium [Y], cerium [Ce], gold [Au], ruthenium [Ru], indium [In], and palladium [Pd].

Preferably, the metal layer consists of at least 95% by mass of silver [Ag] or of copper [Cu].

In particular, the region of the surface of the diaphragm support that is covered by the metal layer extends up to a first distance of no more than 5 mm [millimeters] from the weld seam.

Preferably, the metal layer extends (additionally) up to a second distance of no more 5 mm [millimeters] starting from the weld via the connecting element.

In particular, starting from the diaphragm support and toward the connecting element, the metal layer is coated with the diaphragm layer at least beyond the first connection zone and preferably up to a middle of the weld seam. This ensures that the diaphragm support member as a whole is gas-tight (at least to a gas mixture in the vicinity of the diaphragm support, but permeable to hydrogen, and completely gas-tight in the vicinity of the connecting element and the weld seam).

In particular, a diffusion barrier layer is arranged
at least partially between the metal layer and the weld,
at least partially (preferably completely) between the diaphragm layer and the porous sintered metal of the diaphragm support, and
at least partially (preferably completely) between the metal layer and the porous sintered metal of the diaphragm support.

The remarks regarding the method apply in like manner to the diaphragm support member, and vice versa.

In addition, a reactor for producing hydrogen is proposed in which the reactor has at least one diaphragm support member as described above, the diaphragm support of the diaphragm support member being fixed to the reactor via the connecting element and connected thereto in a gas-tight manner.

Also proposed is the use of the diaphragm support member described above for the separation of hydrogen from gas mixtures.

The invention and the technical environment will be explained in greater detail with reference to the figures. It should be noted that the invention is not intended to be limited by the embodiments shown. In particular, unless explicitly stated otherwise, it is also possible to extract partial aspects of the features explained in the figures and to combine them with other components and insights from the present description and/or figures. Same reference symbols designate same objects, so that explanations of other figures can be consulted where necessary. In the schematic drawing.

Figure 1:
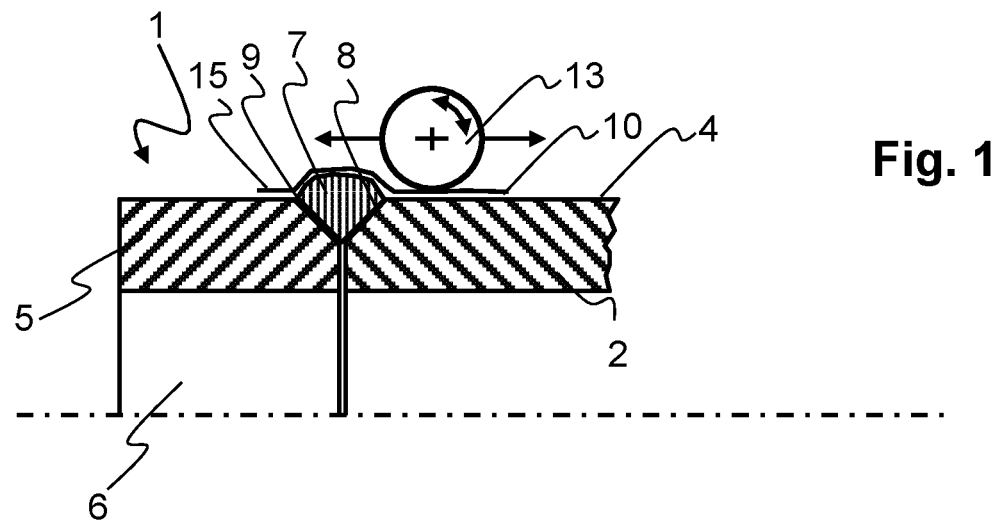
FIG. 1 shows a diaphragm support member in a sectional side view according to step d. of the method.

FIG. 1 shows a diaphragm support member 1 in a sectional side view according to step d. of the method. The diaphragm support 2 and thus also the connecting element 5 are tubular. The diaphragm support member 1 has at a diaphragm support 2 made of a porous sintered metal and a metallic connecting element 5 for connecting the diaphragm support 1 to a gas-carrying line 6. The diaphragm support 1 and the connecting element 5 are connected to one another by means of a weld 7. In this case, a first connection zone 8 is formed between the weld seam 7 and diaphragm support 2 and a second connection zone 9 is formed between the weld seam 7 and the connecting element 5. The weld seam 7 and a region of the surface 4 adjoining the weld seam 7 are covered by a metal layer 15. The metal layer 15 is formed by the foil 10 that is applied in step d.

Here, the metallic foil 10 is pressed in step d. by means of at least one elastically deformable roller 13 against the weld 7 and the surface 4 and possibly also against the connecting element 5.

Figure 2:
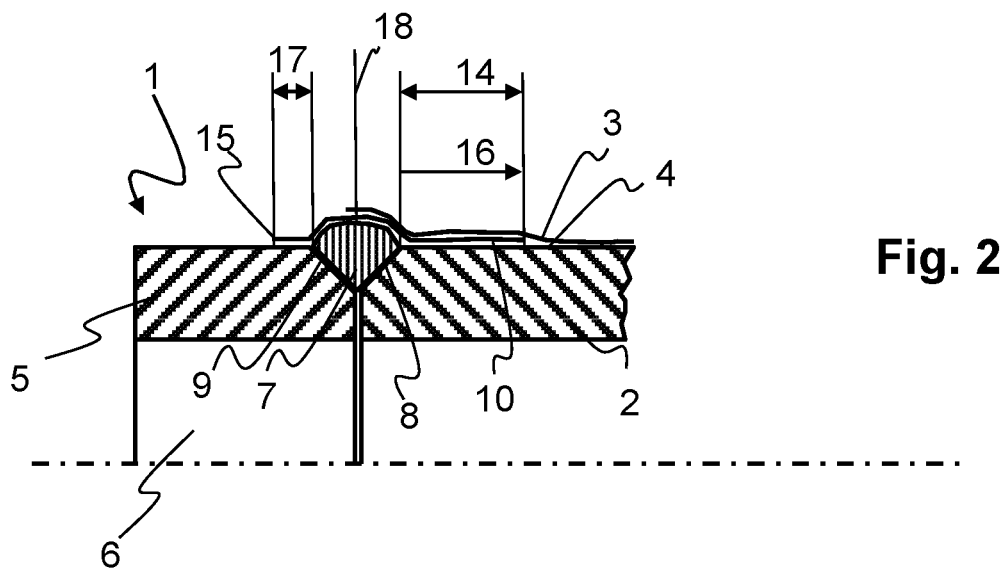
FIG. 2 shows a diaphragm support member in a sectional side view after step f of the method.

FIG. 2 shows a diaphragm support member 1 in a sectional side view after step f of the method. The tubular diaphragm support 2 is joined with the tubular connecting element 5 by a peripheral weld seam 7, so that a gas mixture 21 can be retained within the diaphragm support member 1 and hydrogen 20 can be discharged via the diaphragm support 2 and a gas-tight diaphragm layer 3 to an environment outside the diaphragm support member 1. After step f. of the method, starting from the diaphragm support 2 and toward the connecting element 5, the metal layer 15 is coated with the diaphragm layer 3 at least beyond the first connection zone 8 and preferably up to a middle 18 of the weld seam 7. This ensures that the diaphragm support member 1 as a whole is gas-tight (at least to a gas mixture 21 in the vicinity of the diaphragm support 2, but permeable to hydrogen 20, and completely gas-tight in the vicinity of the connecting element 5 and the weld seam 7).

The region 14 of the surface 4 of the diaphragm support 2 that is covered by the metal layer 15 or the foil 10 extends up to a first distance 16 from the weld seam 7. The metal layer 15 extends additionally up to a second distance 17 starting from the weld seam 7 via the connecting element 5.

Figure 3:
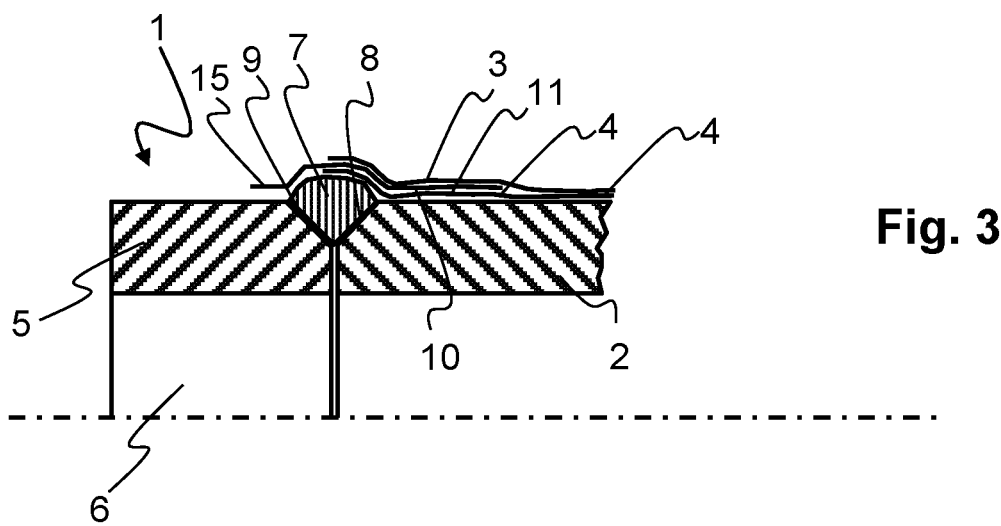
FIG. 3 shows a diaphragm support member in a sectional side view after step f of the method, and additionally with a diffusion barrier layer.

FIG. 3 shows a diaphragm support member 1 in a sectional side view after step f of the method, and additionally with a diffusion barrier layer 11. Before step d., the diaphragm support 2 was coated at least partially with a diffusion barrier layer 11 that at least partially forms the surface 4 of the diaphragm support 2. The diffusion barrier layer 11 is intended to prevent or at least limit degradation of the diaphragm layer 3 as a result of diffusion interactions with the diaphragm support 2. The diffusion barrier layer 11 is also arranged between the foil 10 and the diaphragm support 2, so that the foil 10 rests against the surface 4 of the diaphragm support 2 having the diffusion barrier layer 11.

The diffusion barrier layer 11 is thus disposed at least partially between the metal layer 15 and the weld seam 7, at least partially between the diaphragm layer 3 and the porous sintered metal of the diaphragm support 2, and completely between the metal layer 15 and the porous sintered metal of the diaphragm support 2.

Figure 4:
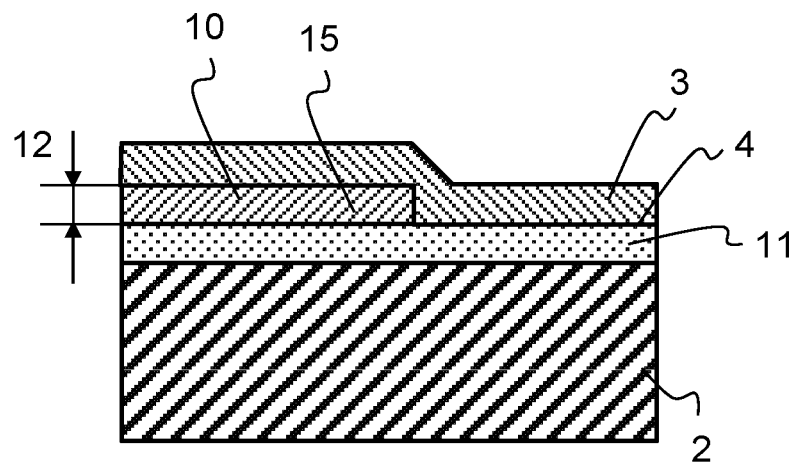
FIG. 4 shows detail of the diaphragm support member according to FIG. 3 in a sectional side view.

FIG. 4 shows detail of the diaphragm support member 1 according to FIG. 3 in a sectional side view. The diffusion barrier layer 11, which forms the surface 4 of the diaphragm support 2 here, is arranged on the diaphragm support 2. The foil 10, which has a thickness of 12 is arranged on the diffusion barrier layer. The diaphragm layer 3 is arranged on the foil 10 and extends beyond the foil 10. The diaphragm layer 3 is arranged so as to be completely separated from the diaphragm support 2 by the diffusion barrier layer 11.

Figure 5:
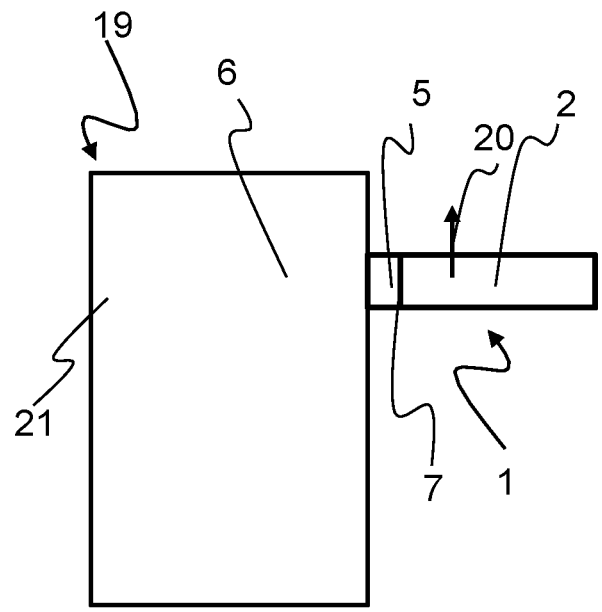
FIG. 5 shows a reactor.

FIG. 5 shows a reactor 19, which has a diaphragm support member 1, the diaphragm support 2 of the diaphragm support member 1 being connected via the connecting element 5 to gas-carrying lines 6 in the reactor 19. The diaphragm support member 1 is fixed by means of the connecting element 5 to the reactor 19 and connected thereto in a gas-tight manner. The diaphragm support member 1 is used here for the separation of hydrogen 20 from gas mixtures 21.

LIST OF REFERENCE SYMBOLS 1 diaphragm support member
2 diaphragm support
3 diaphragm layer
4 surface
5 connecting element
6 line
7 weld seam
8 first connection zone
9 second connection zone
10 foil
11 diffusion barrier layer
12 thickness
13 roller
14 region
15 metal layer
16 first distance
17 second distance
18 middle
19 reactor
20 hydrogen
21 gas mixture

The invention claimed is:

1. A method for manufacturing a diaphragm support member with a diaphragm support made of a sintered metal having a diaphragm layer, comprising at least the following steps:
   a. Providing a laminar or tubular diaphragm support made of a porous sintered metal with a surface that is provided for the purpose of being coated with the diaphragm layer;
   b. providing a metallic connecting element for connecting the diaphragm support to a gas-carrying line;
   c. connecting the diaphragm support and connecting element with a weld seam to the diaphragm support member and forming a first connection zone between the weld seam and diaphragm support and a second connection zone between the weld seam and the connecting element;
   d. arranging a metal layer on the surface and the weld seam so that the metal layer covers at least the first connection zone;
   e. cohesively joining the metal layer at least with the surface and the weld seam; and
   f. coating at least portions of the surface and at least portions of the metal layer with the diaphragm layer.

2. The method as set forth in claim 1, wherein the diaphragm support is coated before step d. at least partially with a diffusion barrier layer that at least partially forms the surface of the diaphragm support.

3. The method as set forth in claim 1, wherein a metal layer comprising at least one of the materials silver [Ag], copper [Cu], yttrium [Y], cerium [Ce], gold [Au], ruthenium [Ru], indium [In], and palladium [Pd] is applied in step d.

4. The method as set forth in claim 3, wherein the metal layer consists of at least 95% by mass of silver [Ag] or of copper [Cu].

5. The method as set forth in claim 1, wherein a metal layer having a thickness of no more than 50 μm [micrometers] is deposited in step d.

6. The method as set forth in claim 1, wherein the metal layer is a metallic foil that is arranged on the surface and the weld seam in step d.

7. The method as set forth in claim 6, wherein the metallic foil is in a soft-annealed state before step d.

8. The method as set forth in claim 6, wherein the metallic foil is pressed in step d. by at least one elastically deformable roller at least against the weld seam and the surface.

9. The method as set forth in claim 6, wherein the metallic foil is joined cohesively at least with the surface by seam welding.

10. The method as set forth in claim 1, wherein the metal layer is joined cohesively at least with the surface and the weld seam by sintering in step e.

11. A diaphragm support member, at least comprising a diaphragm support made of a porous sintered metal and a metallic connecting element for connecting the diaphragm support to a gas-carrying line, wherein the diaphragm support and the connecting element are connected to one another by a weld seam, wherein the diaphragm support has a surface that is coated with a diaphragm layer, wherein the weld seam is at least partially covered by a metal layer and a region adjacent to the weld seam of the surface is covered by a metal layer, and wherein the diaphragm layer is at least partially disposed on the metal layer.

12. The diaphragm support member as set forth in claim 11, wherein the metal layer comprises at least one of the materials silver [Ag], copper [Cu], yttrium [Y], cerium [Ce], gold [Au], ruthenium [Ru], indium [In], and palladium [Pd].

13. The diaphragm support member as set forth in claim 12, wherein the metal layer consists of at least 95% by mass of silver [Ag] or of copper [Cu].

14. The diaphragm support member as set forth in claim 11, wherein the region of the surface of the diaphragm support that is covered by the metal layer extends up to a first distance of no more than 5 mm [millimeters] from the weld seam.

15. The diaphragm support member as set forth in claim 11, wherein the metal layer extends up to a second distance of no more than 5 mm [millimeters] from the weld seam via the connecting element.

16. The diaphragm support member as set forth in claim 11, wherein the metal layer, starting from the diaphragm support and toward the connecting element, is coated with the diaphragm layer at least up to a middle of the weld seam.

17. The diaphragm support member as set forth in claim 11, wherein a diffusion barrier layer is arranged
at least partially between the metal layer and the weld seam,
at least partially between the diaphragm layer and the porous sintered metal of the diaphragm support, and
at least partially between the metal layer and the porous sintered metal of the diaphragm support.

18. A reactor for generating hydrogen, at least comprising a diaphragm support member according to claim 11, wherein the diaphragm support of the diaphragm support member being fixed to the reactor via the connecting element and connected thereto in a gas-tight manner.

19. A method comprising separating hydrogen from gas mixtures using the diaphragm support member of claim 11.

* * * * *